United States Patent Office 3,009,961
Patented Nov. 21, 1961

3,009,961
REACTION PRODUCTS OF DECABORANE WITH SULFOXIDES AND PHOSPHINE OXIDES
Walter H. Knoth, Mendenhall, Pa., assignor to E. I. du Pont de Nemours and Company, Wilmington, Del., a corporation of Delaware
No Drawing. Filed Feb. 25, 1959, Ser. No. 795,336
7 Claims. (Cl. 260—606.5)

This invention relates to new derivatives of decaborane. More particularly, it relates to decaborane derivatives containing phosphorus or sulfur and to a method for their preparation.

Boron compounds have received considerable study during recent years and certain boron hydrides, including decaborane, and their derivatives have been found useful in various applications. Particular applications which have been developed include the use of boron hydrides and their derivatives as chemical reducing agents and as high energy fuels.

It is an object of this invention to provide new decaborane derivatives having certain characteristics that make them of value in the above-mentioned applications and still other applications. Another object is to provide a process for preparing such decaborane derivatives. These and still other objects are accomplished by providing reaction products of decaborane with a member of the class consisting of phosphine oxides and sulfoxides.

The new compounds of this invention have the formula $B_{10}H_{12} \cdot 2R_nXO$, wherein R is a monovalent hydrocarbon radical, X is phosphorus or sulfur, and $n$ is 2 when X is sulfur and 3 when X is phosphorus. The R groups can be the same or different and they can be alkyl, alkenyl, aryl, alkaryl, aralkyl, and cycloalkyl; two of the alkyl groups taken together can be an alkylene radical. Preferably, the monovalent hydrocarbon radicals contain 1–7 carbon atoms.

The preparation of the new products of this invention involves contacting decaborane with the sulfoxide or phosphine oxide of formula $R_nXO$, wherein R, X and $n$ have the significance given above, at a temperature between room temperature, e.g., 20–30° C., and the decomposition temperature of the reaction product. Reaction takes place without the application of external heat and hydrogen is evolved. The reaction is illustrated by the following equation:

$$B_{10}H_{14} + 2R_nXO \rightarrow B_{10}H_{12} \cdot 2R_nXO + H_2$$

Stoichiometry of the reaction requires two moles of phosphine oxide or sulfoxide for each mole of decaborane, and the reaction can be carried out with these proportions of reactants. However, in the reaction with sulfoxides, it is preferred to use an excess of decaborane, e.g., up to a 100% excess, i.e., one mole of decaborane for each mole of sulfoxide. The presence of an excess of sulfoxide in the reaction mixture results in a secondary reaction of the sulfoxide with the decaborane. However, the use of an excess of decaborane minimizes this undesirable secondary reaction.

Reaction between the decaborane and the phosphine oxide or sulfoxide takes place in the absence of any added reaction medium. However, if desired, the reaction can be carried out in an inert reaction medium. Any inert organic solvent for the reactants can be employed. Ethers, e.g., diethyl ether, dibutyl ether, dioxane, ethylene glycol dimethyl ether, and diethylene glycol dimethyl ether, are especially suitable solvents for use in the process of this invention.

As indicated above, the reaction between decaborane and the sulfoxide or phosphine oxide takes place at temperatures between room temperature and the decomposition temperature of the products. Preferably, the reaction is carried out at temperatures between 20° and 60° C.

The reaction is usually carried out at atmospheric or subatmospheric pressures. It is preferred that oxygen and moisture be excluded from the reaction system in order to avoid undesirable by-products. The reaction is conveniently carried out by adding the reactants to an evacuated reaction vessel and then allowing the reaction to proceed at the autogenous pressure developed by the reaction system in the closed vessel. Another convenient method consists in carrying out the reaction between decaborane and the sulfoxide or phosphine oxide at atmospheric pressure in the presence of an inert gas, e.g., nitrogen.

The decaborane and the sulfoxides and phosphine oxides used in the process of this invention can be of the grades of these materials available commercially or they can be made by known methods. It is preferred however to use materials of highest purity available since they give better yields of the desired products.

This invention is illustrated in further detail by the following examples in which the proportions of ingredients are expressed in parts by weight unless otherwise specified.

EXAMPLE I

A mixture of 4.13 g. (33.8 millimoles) of decaborane, 2.64 g. (33.9 millimoles) of dimethyl sulfoxide and 20 ml. of 1,2-dimethoxyethane is placed in a reaction vessel which has been evacuated to a pressure of 1 micron of mercury. The reaction vessel is fitted with a mercury leg to prevent internal pressure rising above one atmosphere. The reaction vessel and its contents are allowed to stand for 3 days at room temperature (ca. 25° C.). At the end of this time, 17.3 millimoles (102%) of hydrogen has been formed and 0.87 g. of a white solid precipitates in the reaction vessel. A trace of methyl sulfide is also found. The white solid is washed with diethyl ether, dried and analyzed.

*Analysis.*—Calc'd for $B_{10}C_4H_{24}O_2S_2$: B, 39.13%; C, 17.37%; H, 8.75%. Found: B, 39.40%, 39.45%; C, 15.74% H, 8.35%.

This compound, which has the formula

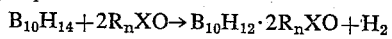

decomposes at 117° C. in a sealed tube. It is insoluble in ethyl acetate, xylene and in diethylene glycol dimethyl ether.

When contacted with concentrated nitric acid, this decaborane-dimethyl sulfoxide reaction product ignites spontaneously and burns vigorously. The addition of this decaborane-dimethyl sulfoxide reaction product to an alcoholic solution of silver nitrate reduces the silver ions to the free metal.

EXAMPLE II

A mixture of 0.4 g. (3.28 millimoles) of decaborane, 2.3 g. (8.27 millimoles) of triphenylphosphine oxide and 20 ml. of 1,2-dimethoxyethane are placed in a reaction vessel which has been evacuated and cooled in a bath of liquid nitrogen. The reactants are mixed in the closed reaction vessel and then allowed to warm to room temperature at autogenous pressure and allowed to stand for 4 days. At the end of this time, 1.4 millimoles of hydrogen has been evolved and 0.8 g. of a yellow crystalline solid is obtained. Analysis indicates this yellow solid to be 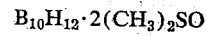.

*Analysis.*—Calc'd for $B_{10}C_{36}H_{42}O_2P_2$: B, 15.98%; C, 63.85%; H, 6.25%; P, 9.17%. Found: B, 16.62%, 16.88%; C, 63.50%, 63.66%; H, 6.25%, 6.44%; P, 9.0%, 9.0%.

This product has a decomposition point of 209–211° C. It ignites spontaneously on contact with nitric acid and burns rapidly. This decaborane triphenylphosphine oxide reaction product also reduces silver nitrate in alcoholic solution to metallic silver.

The examples have illustrated the products and process of this invention by specific reference to the reaction of a certain sulfoxide and a certain phosphine oxide with decaborane. However, any sulfoxide or phosphine oxide of the formula $R_nXO$, wherein R is a monovalent hydrocarbon radical preferably of 1–7 carbon atoms and when two R's taken together form an alkylene radical, X is sulfur or phosphorus and n is 2 when X is sulfur and 3 when X is phosphorus, can be used for reaction with decaborane. For example, when the specific sulfoxides and phosphine oxides listed in the following Table I are reacted with decaborane under the conditions described in the examples, the products listed in the second column of the table are formed.

Table I

| $R_nXO$ | Product |
| --- | --- |
| Diethyl sulfoxide | $B_{10}H_{12} \cdot 2(C_2H_5)_2SO$ |
| Propyl sulfoxide | $B_{10}H_{12} \cdot 2(C_3H_7)_2SO$ |
| Amyl sulfoxide | $B_{10}H_{12} \cdot 2(C_5H_9)_2SO$ |
| Phenyl sulfoxide | $B_{10}H_{12} \cdot 2(C_6H_5)_2SO$ |
| Benzyl sulfoxide | $B_{10}H_{12} \cdot 2(C_6H_5CH_2)_2SO$ |
| Allyl phenyl sulfoxide | $B_{10}H_{12} \cdot 2[(C_3H_5)(C_6H_5)SO]$ |
| Ethyl benzyl sulfoxide | $B_{10}H_{12} \cdot 2[(C_2H_5)(C_6H_5CH_2)SO]$ |
| Tetramethylene sulfoxide | $B_{10}H_{12} \cdot 2(CH_2)_4SO$ |
| Triethylphosphine oxide | $B_{10}H_{12} \cdot 2(C_2H_5)_3PO$ |
| Methylethylphenylphosphine oxide | $B_{10}H_{12} \cdot 2[(CH_3)(C_2H_5)(C_6H_5)PO]$ |
| Tributylphosphine oxide | $B_{10}H_{12} \cdot 2(C_4H_9)_3PO$ |
| p-Tolylphosphine oxide | $B_{10}H_{12} \cdot 2(CH_3C_6H_4)_3PO$ |

The decaborane/sulfoxide and decaborane/phosphine oxide reaction products of this invention are useful in various applications. As indicated above, they are effective reducing agents, e.g., silver nitrate is reduced to metallic silver by treatment with the decaborane/sulfoxide or phosphine oxide reaction products listed above. The reductions proceed rapidly at 25° C. in ethanolic solution.

As shown in the examples, the products of this invention ignite spontaneously when contacted with nitric acid. This is a valuable property, which is not exhibited by decaborane, that makes these products of great value as high energy fuels.

The products of this invention are also useful as curing agents for natural or synthetic rubber.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Chemical products represented by the formula $$B_{10}H_{12} \cdot 2R_nXO$$

wherein the R's are selected from the group consisting of monovalent radicals, when taken individually, and divalent radicals, when two R's are joined together; said monovalent radicals are selected from the group consisting of alkyl, alkenyl, aryl, alkaryl and cycloalkyl; said divalent radicals are alkylene; X is a member of the group consisting of phosphorus and sulfur, and n is 2 when X is sulfur and 3 when X is phosphorus.

2. Reaction products of decaborane with sulfoxides, said products having the formula $$B_{10}H_{12} \cdot 2R_2SO$$

wherein the R's are selected from the group consisting of monovalent radicals, when taken individually, and divalent radicals, when two R's are joined together; said monovalent radicals are selected from the group consisting of alkyl, alkenyl, aryl, alkaryl and cycloalkyl; and said divalent radicals are alkylene.

3. The compound having the formula $$B_{10}H_{12} \cdot 2(CH_3)_2SO$$

4. Process which comprises reacting decaborane with an oxide of the formula $$R_nXO$$

wherein the R's are selected from the group consisting of monovalent radicals, when taken individually, and divalent radicals, when two R's are joined together; said monovalent radicals are selected from the group consisting of alkyl, alkenyl, aryl, alkaryl and cycloalkyl; said divalent radicals are alkylene; X is a member of the group consisting of phosphorus and sulfur, and n is 2 when X is sulfur and 3 when X is phosphorus.

5. Process of claim 4 in which an excess of decaborane based on the stoichiometry of the reaction is employed.

6. Process of claim 4 in which the reactants are brought into contact at a temperature between room temperature and the decomposition temperature of the reaction product.

7. Process of claim 4 in which contact between reactants is effected in the presence of an inert organic solvent.

No references cited.